(12) United States Patent
Huang et al.

(10) Patent No.: US 11,065,814 B2
(45) Date of Patent: Jul. 20, 2021

(54) HEATING DEVICE FOR ADDITIVE MANUFACTURING, HEATING MODULE AND MANUFACTURING APPARATUS THEREWITH

(71) Applicant: National Chung-Shan Institute of Science and Technology, Taoyuan (TW)

(72) Inventors: Chung-Chun Huang, Taipei (TW); Chih-Peng Chen, Taoyuan (TW); Po-Shen Lin, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 450 days.

(21) Appl. No.: 16/168,840

(22) Filed: Oct. 24, 2018

(65) Prior Publication Data
US 2019/0160751 A1    May 30, 2019

(30) Foreign Application Priority Data
Nov. 24, 2017   (TW) .................. 106140904

(51) Int. Cl.
| | | |
|---|---|---|
| B29C 64/295 | (2017.01) |
| B33Y 30/00 | (2015.01) |
| B29C 35/08 | (2006.01) |
| B33Y 40/00 | (2020.01) |
| B29C 64/153 | (2017.01) |
| B29C 64/245 | (2017.01) |
| B29C 64/268 | (2017.01) |
| B33Y 10/00 | (2015.01) |

(52) U.S. Cl.
CPC ........ *B29C 64/295* (2017.08); *B29C 35/0805* (2013.01); *B29C 64/153* (2017.08); *B29C 64/245* (2017.08); *B29C 64/268* (2017.08); *B33Y 30/00* (2014.12); *B33Y 40/00* (2014.12); *B29C 2035/0833* (2013.01); *B33Y 10/00* (2014.12)

(58) Field of Classification Search
CPC ... B29C 64/295; B29C 64/153; B29C 64/245; B29C 64/268; B33Y 10/00
See application file for complete search history.

(56) References Cited

U.S. PATENT DOCUMENTS 5,143,663 A * 9/1992 Leyden ................. B29C 64/135
                                                                264/401
5,722,761 A    3/1998 Knight

FOREIGN PATENT DOCUMENTS

| DE | 10 2015 006 533 A1 | 6/2016 |
| WO | 96/35573 A1 | 11/1996 |
| WO | 2017/131764 A1 | 8/2017 |

* cited by examiner

*Primary Examiner* — Michael M. Robinson
(74) *Attorney, Agent, or Firm* — Winston Hsu (57) ABSTRACT

The present application provides not only a heating device for additive manufacturing but also a heating module and a manufacturing apparatus utilizing the heating device. The heating device utilizes a rotational reflective cover to modulate a heating direction of a heating source, which expands an area correspondingly irradiated by the heating source and enhances uniformity of heating. Besides, the heating modules can be coupled and controlled by a controlling subsystem so as to respectively irradiate different areas with ranges at least partially intersecting each other, which also improves heating uniformity for heating a large area.

3 Claims, 6 Drawing Sheets

HEATING DEVICE FOR ADDITIVE MANUFACTURING, HEATING MODULE AND MANUFACTURING APPARATUS THEREWITH

BACKGROUND OF THE INVENTION

1. Field of the Invention

The invention relates to a heating application, and more particularly, to a heating device capable of uniformly heating a powder layer or an object with a large surface area and to a heating module and a manufacturing apparatus therewith.

2. Description of the Prior Art

A conventional manufacturing apparatus for additive manufacturing includes a controlling subsystem, an energy supplying subsystem, an environment modulating subsystem, and a fabrication subsystem. The energy supplying subsystem supplies a high energy beam, such as a laser beam or an electron beam, for sintering or fusing a surface of powder layer via a scanning heating process. The environment modulating subsystem transports gas into the manufacturing apparatus and controls an atmosphere in the manufacturing apparatus. The fabrication subsystem includes a manufacturing chamber with components, such as a manufacturing platform and a heating base, disposed inside the manufacturing chamber. The controlling subsystem controls operations of the energy supplying subsystem, the environment modulating subsystem, and the fabrication subsystem.

In conventional industrial application, a heating lamp can be adopted as a heat source to heat an object via heat conduction. Besides, a halogen lamp array can also be adopted as the heat source to heat the object via heat radiation. When the aforementioned conventional application is applied to a furnace or the manufacturing apparatus for additive manufacturing, an area of a powder layer directly irradiated by the heat source can have a raised temperature while an area surrounding the irradiated area tends to have lower temperature, which gives rise to a temperature difference. The temperature difference might cause problems of non-uniformly shaped work-piece structure and aggregation of thermal stresses in the work-piece. To solve the aforementioned problem in heating a large area of a powder layer, the conventional application adopts a heating base disposed below powder layers and heating the powder layer via heat conduction. However, as a thickness of the powder layer gets thicker or as the work-piece buried in the powder layers is getting gradually shaped, it is uneasy to uniformly heat a surface of the powder layers above the heating base. Besides, although using the halogen lamp array can heat the surface of the powder layers via heat radiation, spatial configuration of the manufacturing chamber restricts installation of the halogen lamp array to a very restricted number of installation positions in the manufacturing chamber, which results in a problem of non-uniformly heating the surface of the powder layers. The problem becomes more serious as the area of the surface of the powder layers or the size of the work-piece gets larger.

Figure 1:
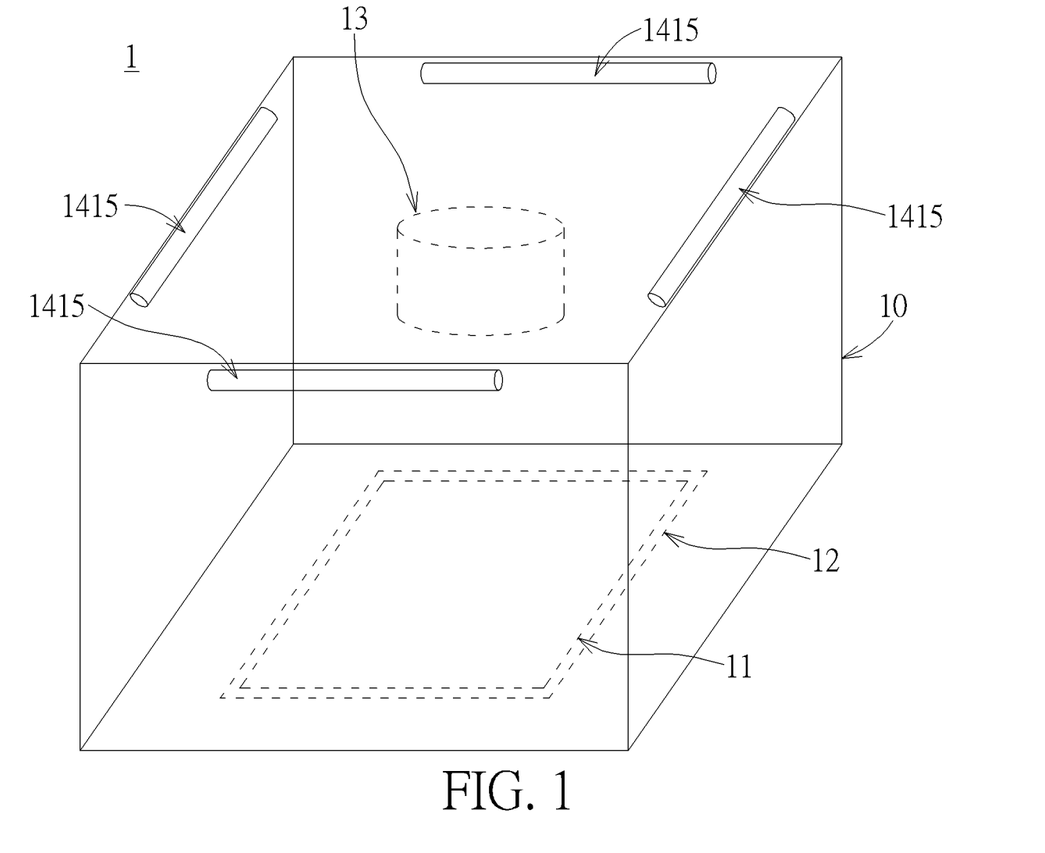
FIG. 1 is a diagram of a conventional manufacturing apparatus for additive manufacturing with a heating application in the prior art.

Besides, please refer to FIG. 1. FIG. 1 is a diagram of a conventional manufacturing apparatus for additive manufacturing with a heating application in the prior art. As shown in FIG. 1, the conventional manufacturing apparatus 1 includes a manufacturing chamber 10. A heating base 12 is disposed at a bottom portion of the manufacturing chamber 10. A manufacturing platform 11 is disposed above the heating base 12. An energy supplying subsystem 13 is disposed at a center of an upper portion of the manufacturing chamber 10 and supplies energy down on powder to be sintered or fused above the manufacturing platform 11.

The conventional heating application adopts four or more heating sources 14‐15, such as lamp tubes, disposed on upper sides of four side walls of the manufacturing chamber 10. The heating sources 14‐15 heat the manufacturing platform 11 with fixed irradiation directions, which leads to non-uniform heat distribution and requires a lot of time to achieve uniform temperature in the manufacturing chamber 10. Therefore, the conventional heating application lacks efficiency.

SUMMARY OF THE INVENTION

Therefore, it is an objective of the present application to provide a heating device for additive manufacturing capable of uniformly heating a powder layer or an object with a large surface area.

It is another objective of the present application to provide heating module utilizing the aforementioned heating device.

It is another objective of the present application to provide a manufacturing apparatus utilizing the aforementioned heating module.

To achieve the aforementioned objectives, the present application discloses a heating device for additive manufacturing which includes a heating source, a reflective cover, a cover rotating unit, a rotation controlling unit, and a heating source holder. The reflective cover covers the heating source and formed in a curved shape. An inner surface of the reflective cover is made of thermal radiation reflective material and faces towards the heating source. The cover rotating unit is for rotating the reflective cover. The rotation controlling unit is for controlling rotation of the cover rotating unit. The heating source holder is for holding the heating source, the reflective cover, the cover rotating unit and the rotation controlling unit. The rotation controlling unit controls the cover rotating unit to rotate the reflective cover so as to modulate a heating direction of the heating device to perform a scanning heating process for irradiating different areas.

According to an embodiment of the present application, the reflective cover is formed in a semicircular curved shape.

According to an embodiment of the present application, the inner surface of the reflective cover facing towards the heating source is coated with a coating layer capable of reflecting thermal radiation.

According to an embodiment of the present application, the heating source is a heating lamp.

The present application further discloses a heating module for additive manufacturing which includes a heating module frame and a plurality of the aforementioned heating devices. The heating module frame is for supporting the plurality of heating devices. Heating directions of the plurality of heating devices are modulated so that the plurality of heating devices irradiate different areas or different locations of a specific area according to a set modulating mode during a complementary scanning heating procedure performed by the plurality of heating devices.

According to an embodiment of the present application, the heating module frame is a rectangular frame, and the heating module includes two heating devices. The two heating devices are disposed substantially parallel to each other and respectively disposed on opposite upper and lower edges of the rectangular frame. The two heating devices irradiate areas with ranges at least partially intersecting each other during the complementary scanning heating procedures performed by the two heating devices.

According to an embodiment of the present application, the heating module includes two heating module frames and four heating devices. Each of the two heating module frames is a rectangular frame. Each pair of the four heating devices is disposed substantially parallel to each other and respectively disposed on opposite upper and lower edges of the corresponding rectangular frame. The two heating module frames are integrated via combining edges without the plurality of heating devices so as to form an L-shaped frame assembly so that the four heating devices irradiate areas with ranges at least partially intersecting each other during the complementary scanning heating procedure performed by the four heating devices.

According to an embodiment of the present application, upper sides of the two heating module frames are connected to form a triangular upper frame.

According to an embodiment of the present application, the heating module includes three heating devices and two heating module frames. Each of the two heating module frames is a rectangular frame. The two heating module frames are integrated via combining vertical edges of the two rectangular frames to form an L-shaped frame assembly with an upper triangular frame on an upper side of the L-shaped frame assembly. The three heating devices are respectively disposed on two lower edges of the two rectangular frames and on a hypotenuse of the upper triangular frame. The three heating devices irradiate areas with ranges at least partially intersecting each other during the complementary scanning heating procedure performed by the three heating devices.

The present application further discloses a manufacturing apparatus for additive manufacturing which includes a manufacturing chamber, a heating base, a manufacturing platform, an energy supplying subsystem, and a plurality of heating modules. The heating base is disposed at a bottom portion of the manufacturing chamber. The manufacturing platform is adjacent to the heating base. The additive manufacturing is performed within a space defined by the manufacturing chamber and the manufacturing platform. The energy supplying subsystem is for supplying a high energy beam for sintering or fusing powder on the manufacturing platform. The plurality of heating modules are for irradiating different areas with ranges at least partially intersecting each other in the manufacturing chamber during a complementary scanning heating procedure performed by the plurality of heating devices. The plurality of heating modules irradiate the different areas other than an area where the additive manufacturing is performed by the energy sintering module.

The manufacturing apparatus further includes an environment modulating subsystem and a controlling subsystem. The environment modulating subsystem is for transporting gas and controlling an atmosphere in the manufacturing apparatus. The controlling subsystem is for controlling operations of the energy supplying subsystem, the environment modulating subsystem, and the plurality of heating modules. The controlling subsystem controls the plurality of heating modules to irradiate the different areas with ranges at least partially intersecting each other in the manufacturing chamber and other than the area where the additive manufacturing is performed by the energy sintering module.

According to an embodiment of the present application, the controlling subsystem not only controls operation of the energy supplying subsystem, but also controls operation of the rotation controlling unit of each heating module so as to achieve a desired heating effect.

In conclusion, the heating device, the heating module, and the manufacturing apparatus for additive manufacturing provided by the present application utilize the rotational reflective cover to modulate the heating direction of the heating source, which enables the heating device to irradiate different areas, expands an area correspondingly irradiated by the heating source, and reduces a required number of heating lamps and consumed energy when heating a large area uniformly. In addition, the heating device can be modulated to perform a scanning heating process for irradiating different areas or different locations of a particular area according to a set modulating mode. In addition, the plurality of heating modules can be coupled and controlled by the controlling subsystem so as to respectively irradiate different areas with ranges at least partially intersecting each other. The present application can be mainly used in the additive manufacturing fields wherein heating a wide range of powder grains or heating a work-piece with large volume or surface area is required, but not limited to this. In other fields of manufacture and industries such as semiconductor production wherein a procedure of heating large area is required, the heating device, the heating module and the manufacturing apparatus provided by the present application can also be applied.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
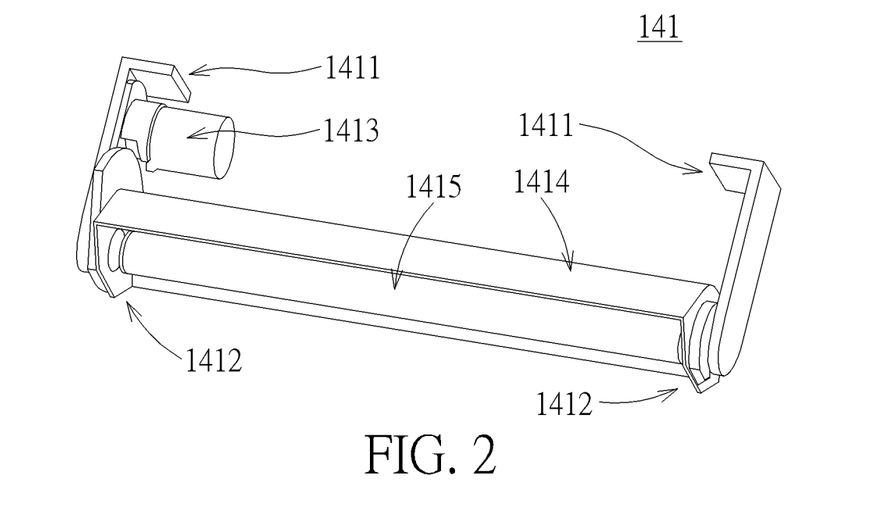
FIG. 2 is a heating device for additive manufacturing according to an embodiment of the present application.

Please refer to FIG. 2. FIG. 2 is a heating device 141 for additive manufacturing according to an embodiment of the present application. As shown in FIG. 2, the present application provides the heating device 141 which includes a heating source 1415 and a heating source holder 1411 for installation of components. A reflective cover 1414, a cover rotating unit 1412, and a rotation controlling unit 1413 are disposed between the heating source 1415 and the heating source holder 1411 and are assembled with the heating source 1415 via the heating source holder 1411. The cover rotating unit 1412 is for rotating the reflective cover 1414. The rotation controlling unit 1413 controls rotation of the cover rotating unit 1412 to rotate the reflective cover 1414. The reflective cover 1414 covers the heating source 1415 and is formed in a curved shape with an inner surface facing towards the heating source 1415. The inner surface of the reflective cover 1414 can be made of a thermal radiation reflective material or coated with a thermal radiation reflective coating layer, but not limited to this.

Therefore, since the controlling subsystem controls operation of the rotation controlling unit 1413, and the rotation of the cover rotating unit 1412 for rotating the reflective cover 1414 is controlled by the rotation controlling unit 1413, a heating direction (or an irradiation direction) of the heating device 141 can be modulated to perform a scanning heating process for irradiating different areas or different locations of a particular area according to a set modulating mode. It should be noticed that the heating source 1415 of the heating device 141 can be, but is not limited to, a quartz halogen lamp, an infrared (IR) lamp, a carbon-fiber heating tube or other thermal radiation heating source or heating lamp. Besides, the reflective cover 1414 can be formed in, but is not limited to, a semicircular curved shape, the cover rotating unit 1412 can be, but is not limited to, an electrically controlled rotor or a motor or a pivot, and the rotation controlling unit 1413 can be a microprocessor or a micro controlling unit, but not limited to this.

Figure 3A:
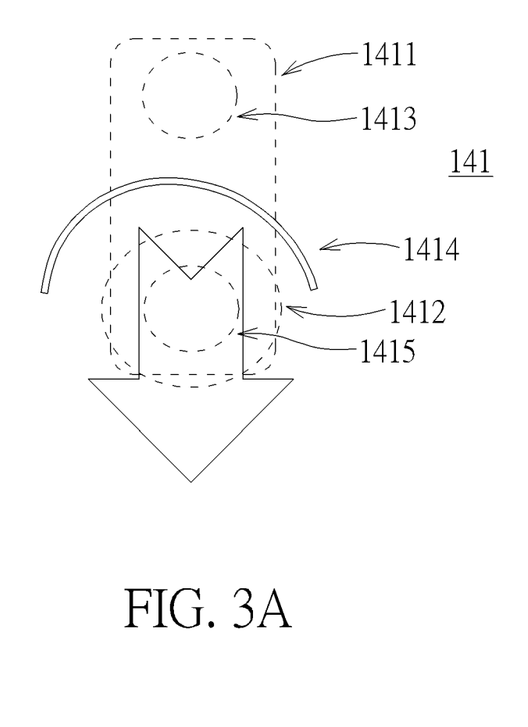
FIG. 3A is a diagram illustrating the heating device with a vertical downward heating direction according to the embodiment of the present application.
Figure 3B:
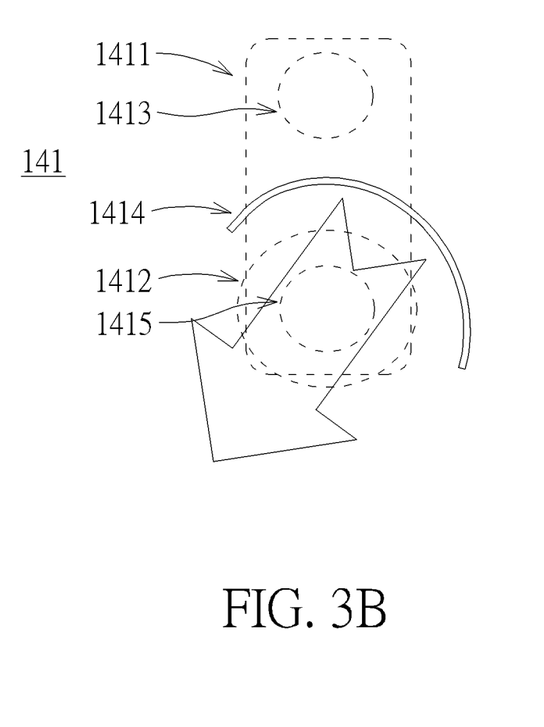
FIG. 3B is a diagram illustrating the heating device with an inclined downward heating direction according to the embodiment of the present application.

Please refer to FIGS. 3A and 3B. FIG. 3A is a diagram illustrating the heating device 141 with a vertical downward heating direction (as shown by the arrowhead in FIG. 3A) according to the embodiment of the present application. FIG. 3B is a diagram illustrating the heating device 141 with an inclined downward heating direction (as shown by the arrowhead in FIG. 3B) according to the embodiment of the present application. As for a first working condition of the heating device 141 shown in FIG. 3A, a concave of the reflective cover 1414 faces substantially vertically downwards so that the heating device 141 irradiates an area under the heating device 141 for scanning heating. As for a second working condition of the heating device 141 shown in FIG. 3B, the concave of the reflective cover 1414 is rotated in a clockwise direction and faces towards a bottom-left orientation so that the heating device 141 irradiates an area in the bottom-left direction for scanning heating. Therefore, by rotating the reflective cover 1414 of the heating device 141, the present application can modulate the heating source 1415 to irradiate and heat different areas according to the set modulating mode.

Figure 4:
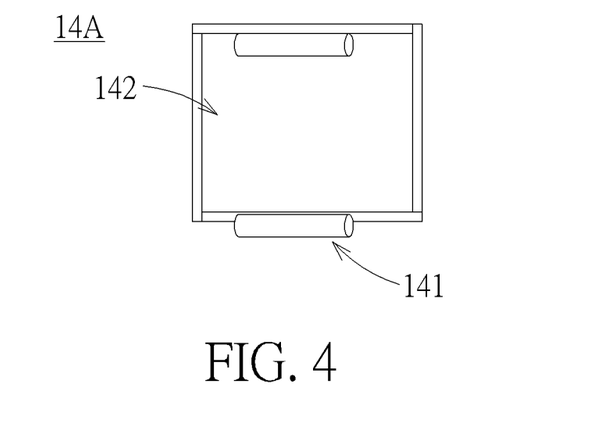
FIG. 4 is a diagram of a heating module according to an embodiment of the present application.

Please refer to FIG. 3A, FIG. 3B, and FIG. 4. FIG. 4 is a diagram of a heating module 14A according to an embodiment of the present application. The present application further provides the heating module 14A which includes the heating device 141 of the previous embodiments and a heating module frame 142 for supporting the heating device 141. One or more heating devices 141 can be spatially installed to the heating module frame 142, and the heating devices 141 can be controlled to rotate the reflective covers 1414 according to the set modulating modes so that more uniform irradiation for heating different areas can be achieved. As for the heating module 14A of the embodiment shown in FIG. 4, the heating module frame 142 can be a rectangular frame, and two heating devices 141 are respectively installed to upper and lower edges of the corresponding rectangular frame and parallel to each other. Therefore, heating directions of the two heating devices 141 can be controlled to rotate according to the set modulating modes for uniformly irradiating and heating different areas, and the areas can have ranges at least partially intersecting each other during the complementary scanning heating procedures performed by the two heating devices 141 so that uniform heating can be achieved.

Figure 5:
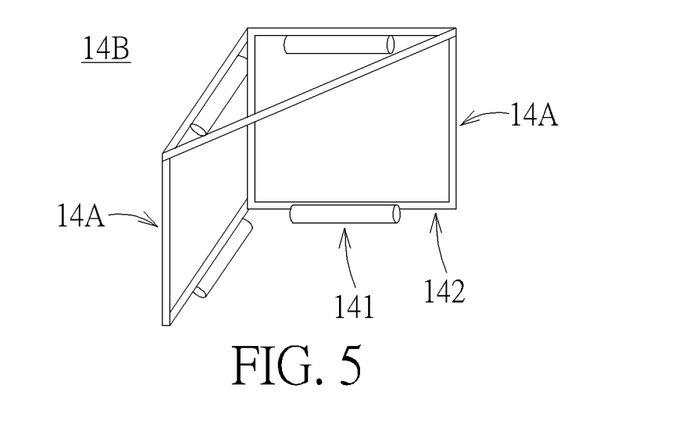
FIG. 5 is a diagram of a heating module according to another embodiment of the present application.
Figure 6:
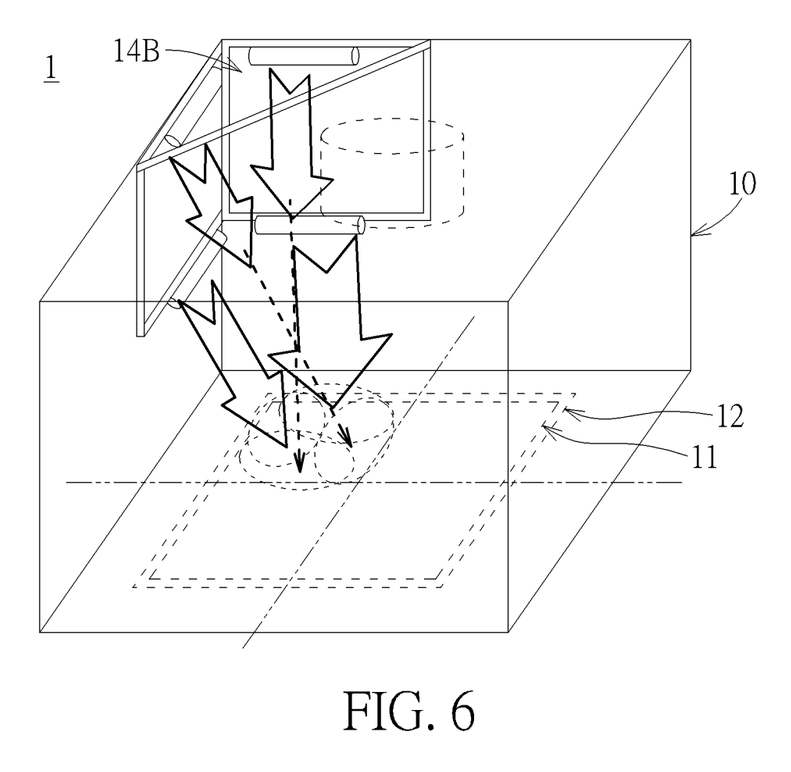
FIG. 6 is a diagram illustrating a collaboration between the heating devices of the heating module according to the another embodiment of the present application.
Figure 7:
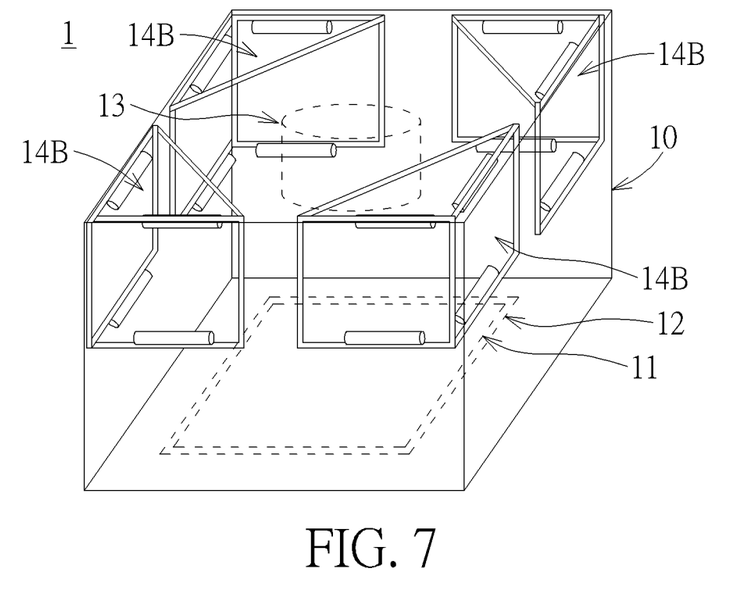
FIG. 7 is a diagram illustrating a configuration of the heating modules in a manufacturing apparatus for additive manufacturing according to the another embodiment of the present application.
Figure 8:
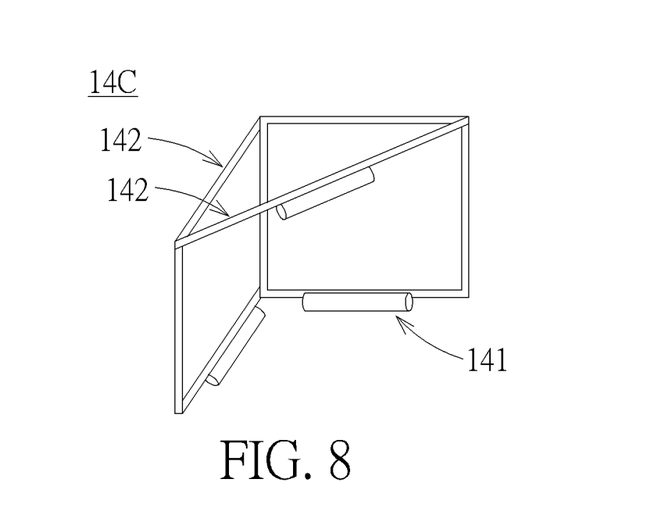
FIG. 8 is a diagram of a heating module according to another embodiment of the present application.
Figure 9:
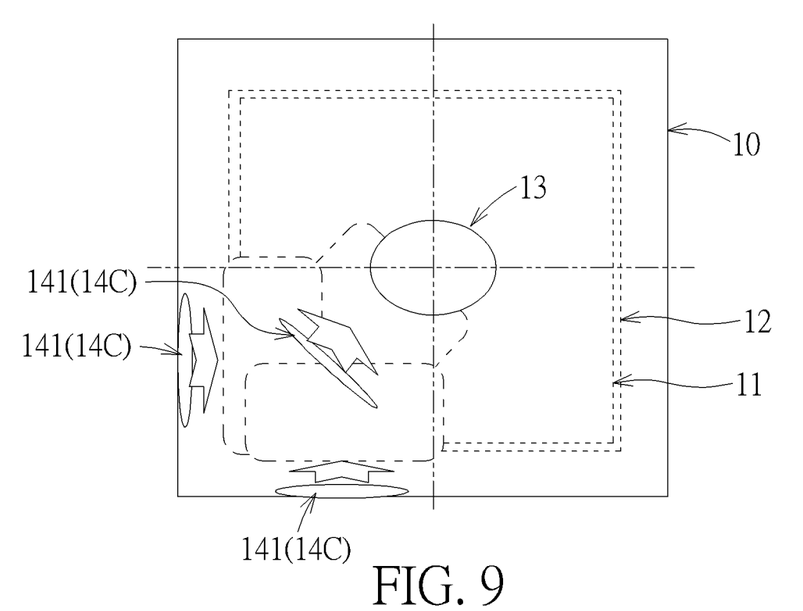
FIG. 9 is a diagram illustrating a collaboration between the heating devices of the heating module according to the another embodiment of the present application.
Figure 10:
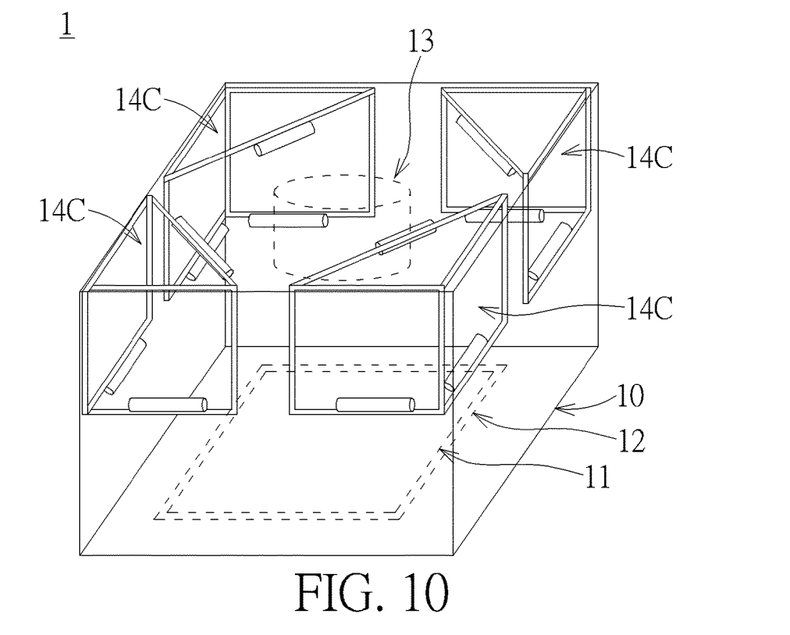
FIG. 10 is a diagram illustrating a configuration of the heating modules in a manufacturing apparatus for additive manufacturing according to the another embodiment of the present application.

Please refer to FIG. 5, FIG. 6 and FIG. 7. FIG. 5 is a diagram of a heating module 14B according to another embodiment of the present application. FIG. 6 is a diagram illustrating a collaboration between the heating devices of the heating module 14B according to the another embodiment of the present application. FIG. 7 is a diagram illustrating a configuration of the heating modules 14B in a manufacturing apparatus for additive manufacturing according to the another embodiment of the present application. As shown in FIG. 5, the heating module 14B consists of a pair of the heating modules 14A of the previous embodiment, and the two heating modules 14A are assembled via combining edges without the heating devices 141 so as to form an L-shaped frame assembly. The heating module 14B includes four heating devices 141, and the four heating devices 141 are coupled and controlled by a controlling subsystem of the manufacturing apparatus 1. Therefore, heating directions (as shown by the arrowheads in FIG. 6) of the four heating devices 141 can be controlled to rotate according to the set modulating modes for uniformly irradiating and heating different areas, and the areas can have ranges at least partially intersecting each other, as shown in FIG. 6, during the complementary scanning heating procedures performed by the four heating devices 141. It should be noticed that the respective upper sides of the two heating module frames 142 can be connected to form a triangular upper frame, and Please refer to FIG. 8, FIG. 9 and FIG. 10. FIG. 8 is a diagram of a heating module 14C according to another embodiment of the present application. FIG. 9 is a diagram illustrating a collaboration between the heating devices of the heating module 14C according to the another embodiment of the present application. FIG. 10 is a diagram illustrating a configuration of the heating modules 14C in a manufacturing apparatus for additive manufacturing according to the another embodiment of the present application. As shown in FIG. 8, the heating module 14C consists of a pair of the heating modules 14A of the previous embodiment, and the two heating modules 14A are assembled via combining respective vertical edges of the two rectangular frames of the two heating modules 14A to form an L-shaped frame assembly with an upper triangular frame disposed on an upper side of the L-shaped frame assembly. The heating module 14C includes three heating devices 141. Two of the heating devices 141 are respectively installed on lower edges of the two corresponding rectangular frames, and the rest one of the heating devices 141 is installed on a hypotenuse of the upper triangular frame. The three heating devices 141 are coupled and controlled by a controlling subsystem of the manufacturing apparatus 1. Therefore, heating directions (as shown by the arrowheads in FIG. 9) of the three heating devices 141 can be controlled to rotate according to the set modulating modes for uniformly irradiating and heating different areas, and the areas can have ranges at least partially intersecting each other, as shown in FIG. 9, during the complementary scanning heating procedures performed by the three heating devices 141.

It should be noticed that a manufacturing apparatus 1 for additive manufacturing can include at least one of the aforementioned embodiments of heating modules 14A, 14B, 14C coupled for uniformly irradiating and heating different areas, according to an optimal modular design proposed for the manufacturing apparatus 1.

Please refer to FIG. 7 or FIG. 10. The present application further provides the modularized manufacturing apparatus 1 for additive manufacturing which includes the manufacturing chamber 10, the manufacturing platform 11, the heating base 12, an energy supplying subsystem 13 and four or more heating modules. A space in the manufacturing chamber 10 and bounded by the manufacturing platform 11 is a location where the additive manufacturing is performed. The manufacturing platform 11 is disposed adjacent to or, specifically, on the heating base 12 and is an area where work-pieces are being shaped via additive manufacturing, such as by sintering or fusion. The heating base 12 is disposed at a bottom portion of the manufacturing chamber 10 and is a main heat source for raising temperature of the powder on the manufacturing platform 11 by heating the powder. The plurality of heating modules are coupled and controlled by a controlling subsystem of the manufacturing apparatus 1 to respectively irradiate and heat different areas. The energy supplying subsystem 13 supplies a high energy beam for sintering or fusing powder via a scanning heating process. When the energy supplying subsystem 13 sinters or fuses the powder on a particular area, the plurality of heating modules particularly irradiate other areas surrounding the area where the sintering or fusion is performed. It should be noticed that the energy supplying subsystem 13 can be, but is not limited to, an energy sintering module.

The manufacturing apparatus 1 can further include an environment modulating subsystem and a controlling subsystem. The environment modulating subsystem transports gas and controls an atmosphere in the manufacturing apparatus 1. The controlling subsystem controls operations of the energy supplying subsystem, the environment modulating subsystem and the plurality of heating modules. The plurality of heating modules are coupled and controlled by the controlling subsystem so as to respectively irradiate different areas with ranges at least partially intersecting each other.

Figure 11:
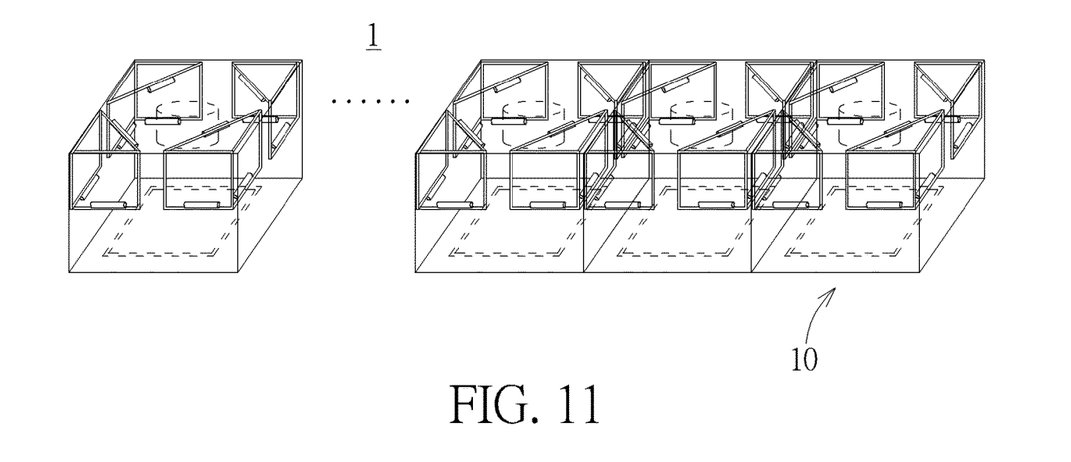
FIG. 11 is a diagram of large-scale manufacturing equipment for additive manufacturing according to an embodiment of the present application.

A conventional heating source (or device) utilized in a conventional manufacturing equipment has only a fixed irradiating direction that results in heating the powder non-uniformly, which is a problem that can be easily noticed when the scale of the additive manufacturing is expanded with the large-scale manufacturing equipment. Please refer to FIG. 11. FIG. 11 is a diagram of large-scale manufacturing equipment for additive manufacturing according to an embodiment of the present application. The large-scale manufacturing equipment includes a plurality of manufacturing apparatus 1 for additive manufacturing. In contrast to the conventional heating source, the heating devices 141 with rotational heating directions provided by the present application can be coupled and controlled by the controlling subsystem so as to respectively irradiate different areas. In addition, when the energy supplying subsystem 13 sinters or fuses the powder on a particular area, the plurality of heating devices 141 particularly irradiate other areas surrounding the area where the sintering or fusion is performed.

It should be noticed that arrangement and installation orientation of the heating devices 141 and the heating modules 14 of the present application can be adjusted according to actual demands, and the aforementioned description of the exemplary embodiments is intended to be illustrative and not to limit the scope of the invention.

In conclusion, the heating device, the heating module, and the manufacturing apparatus for additive manufacturing provided by the present application utilize the rotational reflective cover to modulate the heating direction of the heating source, which enables the heating device to irradiate different areas, expands an area correspondingly irradiated by the heating source, and reduces a required number of heating lamps and consumed energy when heating a large area uniformly. In addition, the heating device can be modulated to perform a scanning heating process for irradiating different areas or different locations of a particular area according to a set modulating mode. In addition, the plurality of heating modules can be coupled and controlled by the controlling subsystem so as to respectively irradiate different areas with ranges at least partially intersecting each other. The present application can be mainly used in the additive manufacturing fields wherein heating a wide range of powder grains or heating a work-piece with large volume or surface area is required, but not limited to this. In other fields of manufacture and industries such as semiconductor production wherein a procedure of heating large area is required, the heating device, the heating module and the manufacturing apparatus provided by the present application can also be applied.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A heating module for additive manufacturing, the heating module comprising:
  four heating devices, each of the four heating devices comprising:
    a heating source;
    a reflective cover covering the heating source and formed in a curved shape, an inner surface of the reflective cover facing towards the heating source, the inner surface being made of thermal radiation reflective material;
    a cover rotating unit for rotating the reflective cover;
    a rotation controlling unit for controlling rotation of the cover rotating unit, wherein the rotation controlling unit controls the cover rotating unit to rotate the reflective cover so as to modulate heating directions of the four heating devices to perform a scanning heating process for irradiating different areas; and
    a heating source holder for holding the heating source, the reflective cover, the cover rotating unit and the rotation controlling unit; and
  two heating module frames for supporting the four heating devices, each of the two heating module frames being a rectangular frame;
  wherein the heating directions of the four heating devices are modulated so that the four heating devices irradiate different areas or different locations of a specific area according to a set modulating mode during a complementary scanning heating procedure performed by the four heating devices, each pair of the four heating devices are disposed substantially parallel to each other and respectively disposed on opposite upper and lower edges of the corresponding rectangular frame, and the two heating module frames are integrated via combining edges without the four heating devices so as to form an L-shaped frame assembly so that the four heating devices irradiate areas with ranges at least partially intersecting each other during the complementary scanning heating procedure performed by the four heating devices.

2. The heating module of claim 1, wherein upper sides of the two heating module frames are connected to form a triangular upper frame.

3. A heating module for additive manufacturing, the heating module comprising:
  three heating devices, each of the three heating devices comprising:
    a heating source;
    a reflective cover covering the heating source and formed in a curved shape, an inner surface of the reflective cover facing towards the heating source, the inner surface being made of thermal radiation reflective material;
    a cover rotating unit for rotating the reflective cover;
    a rotation controlling unit for controlling rotation of the cover rotating unit, wherein the rotation controlling unit controls the cover rotating unit to rotate the reflective cover so as to modulate heating directions of the three heating devices to perform a scanning heating process for irradiating different areas; and
    a heating source holder for holding the heating source, the reflective cover, the cover rotating unit and the rotation controlling unit; and
  two heating module frames for supporting the three heating devices, each of the two heating module frames being a rectangular frame;
  wherein the heating directions of the three heating devices are modulated so that the three heating devices irradiate different areas or different locations of a specific area according to a set modulating mode during a complementary scanning heating procedure performed by the three heating devices, the two heating module frames are integrated via combining vertical edges of the two rectangular frames to form an L-shaped frame assembly with an upper triangular frame on an upper side of the L-shaped frame assembly, the three heating devices are respectively disposed on two lower edges of the two rectangular frames and on a hypotenuse of the upper triangular frame, and the three heating devices irradiate areas with ranges at least partially intersecting each other during the complementary scanning heating procedure performed by the three heating devices.

* * * * *